(12) United States Patent
Hipsley et al.

(10) Patent No.: US 12,295,348 B2
(45) Date of Patent: May 13, 2025

(54) ANIMAL SAFETY COLLAR

(71) Applicant: Steven J. Hipsley, Malta, NY (US)

(72) Inventors: Steven J. Hipsley, Malta, NY (US);
Brandon F. Hipsley, Malta, NY (US)

(73) Assignee: Steven J. Hipsley, Malta, NY (US)

( * ) Notice: Subject to any disclaimer, the term of this patent is extended or adjusted under 35 U.S.C. 154(b) by 217 days.

(21) Appl. No.: 18/131,234

(22) Filed: Apr. 5, 2023

(65) Prior Publication Data

US 2023/0320321 A1    Oct. 12, 2023

Related U.S. Application Data

(60) Provisional application No. 63/329,363, filed on Apr. 8, 2022.

(51) Int. Cl.
*G08B 29/00* (2006.01)
*A01K 11/00* (2006.01)
*A01K 27/00* (2006.01)

(52) U.S. Cl.
CPC .......... *A01K 11/008* (2013.01); *A01K 27/001* (2013.01); *A01K 27/009* (2013.01)

(58) Field of Classification Search
CPC ... A01K 11/008; A01K 27/001; A01K 27/009
See application file for complete search history.

(56) References Cited

U.S. PATENT DOCUMENTS

| | | | | |
|---|---|---|---|---|
| 8,803,692 | B2* | 8/2014 | Goetzl | A01K 27/009 |
| | | | | 340/573.3 |
| 2011/0061605 | A1* | 3/2011 | Hardi | A01K 27/009 |
| | | | | 340/573.3 |
| 2015/0040839 | A1* | 2/2015 | Goetzl | A01K 15/021 |
| | | | | 119/720 |
| 2018/0132450 | A1* | 5/2018 | Goetzl | A01K 15/021 |
| 2019/0104707 | A1* | 4/2019 | Gotts | A01K 27/001 |
| 2020/0323170 | A1* | 10/2020 | Garigan | H04Q 9/00 |
| 2021/0327243 | A1 | 10/2021 | Franco et al. | |
| 2022/0151207 | A1* | 5/2022 | Mott | A01K 29/005 |

* cited by examiner

*Primary Examiner* — Toan N Pham
(74) *Attorney, Agent, or Firm* — Jong Patent Firm; Cheng Ning Jong; Tracy P. Jong

(57) ABSTRACT

An animal safety collar system adapted to safeguard an animal, the system including a collar configured to be attached to the animal; a first communication module coupled to the collar and a first control device configured to control the first communication module; and at least one second communication module and a second control device, the at least one second communication module is configured to be functionally connected via a communication to the first communication module, wherein the first communication module is configured to cooperate with the at least one second communication module to identify a location of the animal and the communication is disposed at Sub-1 Gigahertz frequency in order to conserve an energy source drawn to support the communication.

22 Claims, 12 Drawing Sheets

| Zone | Departure Risk | Accuracy Required | Location Update Rate | Communication | Location Modules |
|---|---|---|---|---|---|
| Safe | Lowest | Low | Slowest | Sub-1 GHz / BLE | Sub-1 GHz / BLE |
| Monitor | Low | Low | Slow | Sub-1 GHz | Sub-1 GHz |
| Watch | Med | Med | Med | Sub-1 GHz | Sub-1 GHz + GPS |
| Correction | High | Highest | Real-time | Sub-1 GHz + Cellular | Sub-1 GHz + GPS |
| Departure | Exceeded | Highest | Real-time | Cellular | GPS |

FIG. 4

ANIMAL SAFETY COLLAR

PRIORITY CLAIM AND RELATED APPLICATIONS

This non-provisional application claims the benefit of priority from provisional application U.S. Ser. No. 63/329,363 filed on Apr. 8, 2022. Said application is incorporated by reference in its entirety.

BACKGROUND OF THE INVENTION

1. The Field of the Invention

The present invention relates to an animal safety collar. More specifically, the present invention is directed to a low power dog safety collar.

2. Background Art

A tremendous effort has been made in the pet industry to provide collars capable of locating pets equipped with the collars. Most wireless animal, e.g., dog, collars are only equipped with Global Positioning System (GPS) devices for location determination. These collars use GPS technology to track and locate a dog's whereabouts in real-time. They can also have additional features such as geofencing, activity monitoring, and health tracking. They are a useful tool for pet owners who want to keep track of their dog's location and ensure their safety. However, GPS devices tend to be highly inefficient in power consumption and require power replenishments often. In use and to be useful, the GPS receiver on the collar frequently scans for and receives signals from orbiting satellites. This process requires significant amounts of energy which drains the battery of the collar. To ensure that the collar remains functional for prolonged periods of time, it is important to conserve energy whenever possible. This may be achieved through design measures, e.g., low power consumption and efficient power management systems. Some manufacturers may use low-power GPS chips that can consume less energy and extend the battery life of the collar. The GPS module could be programmed to enter sleep mode when it is not being used or when the collar is stationary. However, challenges remain in determining when sleep mode should commence and end. Adaptive tracking may be used to adjust the location update frequency based on the dog's location, speed and activity level. For instance, when the dog is moving fast, the location updates could be more frequent and when the dog is static, the updates could be less frequent, conserving energy. An attempt to provide an alternative solution to a GPS-equipped collar is shown below:

U.S. Pat. Pub. No. 20210327243 of Franco et al. (Hereinafter Franco) discloses systems and methods related to a wireless tracking system. The wireless tracking system has a plurality of beacons, each beacon having at least one antenna and at least one power source. When the at least one antenna is supplied with power via the power source, a local ping is transmitted from the beacon. A wireless tracking device then receives the ping via its own antenna. Once the wireless tracking device has received a locational ping from at least two of the plurality of beacons, it can then calculate a direct connection path between the at least two beacons. Based on this known path, the wireless tracking device can then determine a distance between the wireless tracking device and connection path. Based on the determined distance, the wireless tracking device may then issue a corrective measure. Franco uses a UWB device that operates at a frequency range of about 3.1 GHz to about 10.6 GHz, a device incapable of maintaining a low power consumption in operation.

There exists a need for an animal safety collar that is not only capable of accurate location determination but one which is capable of low power operations, thereby prolonging the periods between power replenishments.

SUMMARY OF THE INVENTION

In accordance with the present invention, there is provided an animal safety collar system adapted to safeguard an animal, the system including:
(a) a collar configured to be attached to the animal;
(b) a first communication module coupled to the collar and a first control device configured to control the first communication module; and
(c) at least one second communication module and a second control device configured to control the at least one second communication module, the at least one second communication module is configured to be functionally connected via a first communication to the first communication module,
wherein the first communication module is configured to cooperate with the at least one second communication module to identify a location of the animal and the communication is disposed at Sub-1 Gigahertz frequency in order to conserve an energy source drawn to support the communication.

In one embodiment, the animal safety collar system further includes a third communication module and at least one fourth communication module, the third communication module is coupled to the collar and the first control device is further configured to control the third communication module, the second control device is further configured to control the at least one fourth communication module, the at least one fourth communication module is configured to be functionally connected via a second communication to the third communication module, wherein the third communication module is configured to cooperate with the at least one fourth communication module to identify a location of the animal and the second communication is disposed at Bluetooth Low Energy (BLE) in order to conserve the energy source drawn to support the second communication. In one embodiment, the animal safety collar further includes a cellular communication module configured to be disposable in one of an on state and an off state, the cellular communication module functionally connected to the first control device, wherein the cellular communication module is only disposed in an on state when the location indicates a tendency for an uncontrolled departure of the collar from the at least one second communication module and an action is taken to reduce the tendency. In one embodiment, the action includes notifying a caretaker of the animal. In one embodiment, the animal safety collar system further includes a global positioning system (GPS) configured to be disposable in one of an on state and an off state, the GPS functionally connected to the first control device, wherein the GPS is only disposed in an on state when the location indicates a tendency for an uncontrolled departure of the collar from the at least one second communication module and an action is taken to reduce the tendency. In one embodiment, the action includes notifying a caretaker of the animal. In one embodiment, the animal safety collar system further includes a shock probe configured for supplying electrical feedback to the animal, the shock probe functionally connected to the first control device and configured to be disposed in contacting engagement with the animal to supply feedback to indicate to the animal that it is nearing a controlled boundary and to discontinue its current trajectory. In one embodiment, the animal safety collar system further includes a haptic actuator functionally connected to the first control device and configured for supplying vibrational feedback to indicate to the animal that it is nearing a controlled boundary and to discontinue its current trajectory. In one embodiment, the animal safety collar system further includes an acoustic device functionally connected to the first control device and configured for supplying auditory feedback to indicate to the animal that it is nearing a controlled boundary and to discontinue its current trajectory. In one embodiment, the animal safety collar system further includes a closeable strap, a cradle and a modular housing, wherein the closeable strap is configured to be worn around a neck of the animal, the cradle disposed on the closeable strap, the modular housing is configured to be securable in and removable from the cradle and the modular housing is configured to contain the energy source. In one embodiment, the animal collar system further includes an inertial measurement unit (IMU) configured for providing an acceleration and a heading of the animal, wherein if the location is determined to be disposed in a zone with a potential risk of departure, the acceleration exceeds a predetermined acceleration threshold and the heading indicates a heading away from a safe zone while in the zone with a potential risk of departure, an action is taken to reduce the tendency of the animal to continue to depart farther away from the safe zone. In one embodiment, the collar is a dog collar.

In accordance with the present invention, there is further provided an animal safety collar system adapted to safeguard an animal, the system including:

(a) a collar configured to be attached to the animal, the collar including a closeable strap and a cradle disposed on the closeable strap;

(b) a first communication module functionally connected to a second communication module according to a communication and a first control device configured to control the first communication module; and (c) a modular housing, wherein the closeable strap is configured to be attached to a portion of the animal, the modular housing is configured to be securable in and removable from the cradle and the modular housing is configured to contain an energy source to power the first communication module.

An object of the present invention is to provide an animal, e.g., dog, safety collar system that can operate without daily replacement of its power supply.

Another object of the present invention is to provide an animal safety collar system that provides locational and other data suitable for indicating the movements of an animal.

Another object of the present invention is to provide an animal safety collar system that provides automatic animal behavior corrections to relieve the caretaker from being frequently notified or engaged to carry out corrective actions manually.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is a table showing communication modes between a collar module and external devices in various zones.

PARTS LIST

Figure 1:
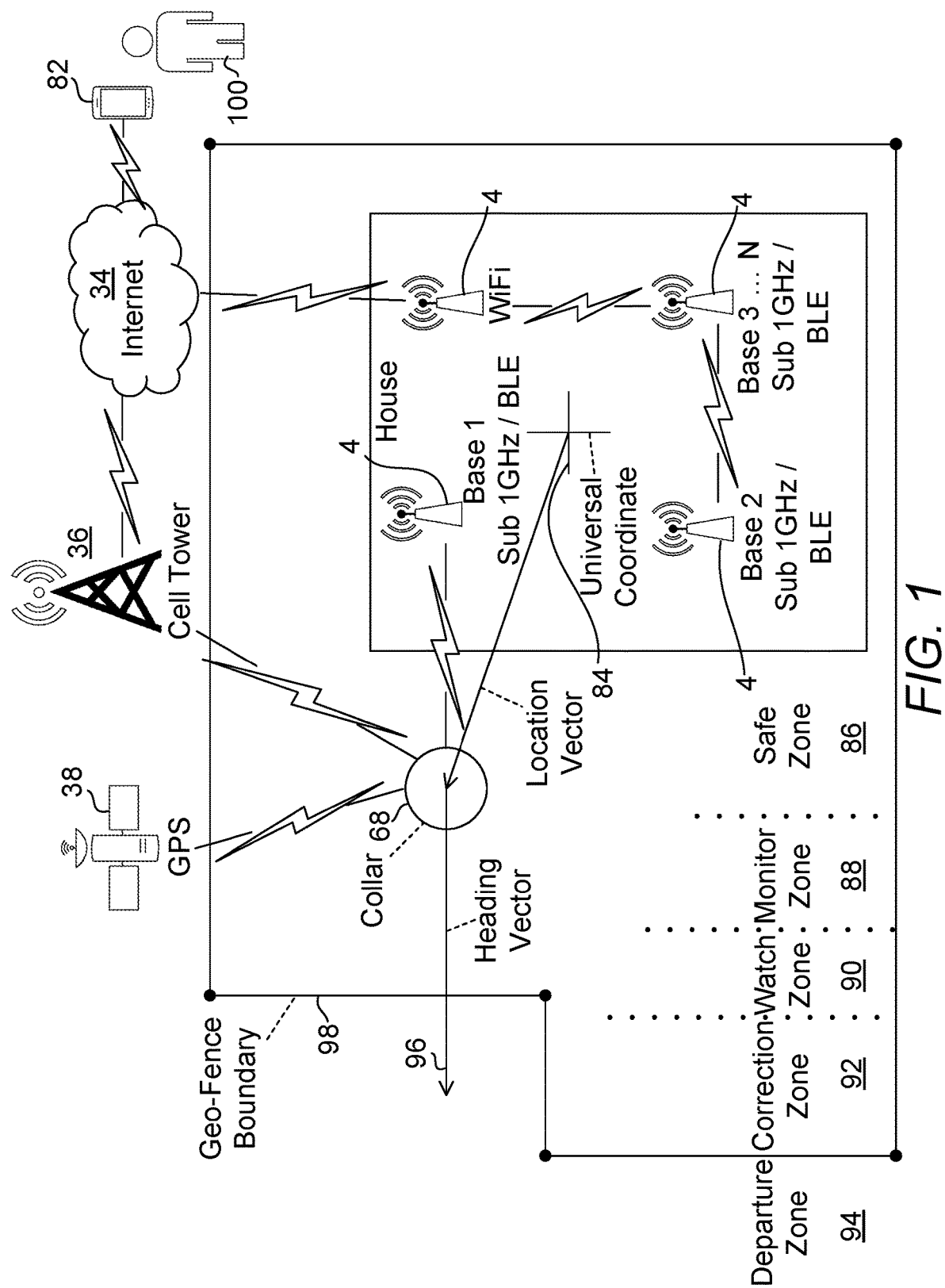
FIG. 1 is a diagram depicting one embodiment according to the present animal safety collar system.

2—collar module
4—anchor or base station module
6—collar module control device
8—base station module control device
10—collar module inertial measurement unit (IMU)
12—base station module IMU
14—collar module memory device
16—base station module memory device
18—collar module power management module
20—base station module power management module
22—collar module battery
24—base station module battery
26—collar module LED
28—base station module LED
30—collar module button 32—base station module button
34—internet
36—cellular tower
38—satellite
40—Wireless Fidelity (Wi-Fi) router
42—Wi-Fi module
44—haptic actuator
46—acoustic actuator, e.g., speaker or buzzer
48—strap
50—collar module Sub-1 GHz transceiver or communication module
52—collar module Bluetooth Low Energy (BLE) transceiver or communication module
54—cellular modem
56—antennas
58—electric correction energy reserve
60—latch
62—base station module Sub-1 GHz transceiver
64—base station module BLE transceiver
66—global positioning system (GPS) module
68—collar
70—electrical actuator or shock electrode/probe
72—cradle
74—male portion of buckle
76—female portion of buckle
78—adjustment clasp
80—charging station
82—mobile device
84—universal coordinate
86—safe zone
88—monitor zone
90—watch zone
92—correction zone
94—departure zone
96—heading vector
98—geo-fence boundary
100—caretaker
102—upper shell
104—lower shell
106—probe/charging connection Particular Advantages of the Invention The present animal, e.g., dog, collar system is a safety device useful for enhancing the safety of dogs that traverse greater distances at great speeds, are free to roam without physical boundaries, e.g., fences and in spaces or areas defined by obstacles, e.g., walls, that can potentially pose as barriers to communications between the animal collar and its controller or base stations.

Compared to prior art animal collars having batteries of equivalent energy capacity, the present animal collar does not require frequent energy replenishments, e.g., daily, due to a number of factors. In one embodiment, radio communication in the Sub-1 GHz range is used in one embodiment and Bluetooth Low Energy (BLE) is used in another embodiment. As such, energy consumption due to the localization of the animal collar can be minimized. The conservation of energy is further aided by the automatic adjustment of communications, e.g., reduced polling rate, between the collar module and its base stations. The present animal, e.g., pet, collar is useful for replacing a physical barrier, e.g., a fence, in restraining a pet or to slow or prevent the movement of the pet in a direction, e.g., away from the pet's residence or designated area of movement.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

In one aspect, the present animal collar system is configured to provide an animal, e.g., pet, owner with an effective means of virtually fencing his or her pet within an area, along with real time location services to facilitate tracking the pet in the unlikely event of an escape. Disclosed elsewhere herein is a simplified geofence system utilizing a localization system where the mobile portion, e.g., the collar, of the system utilizes a low power communication mechanism as well as protocol, e.g., Sub-1 GHz and Bluetooth Low Power (BLE) frequencies to make replacement of the onboard energy source or battery for the mobile portion of the collar system less frequent, thereby encouraging the use of the present collar system. No wires are required to be buried to mark the periphery of an area within which an animal to be controlled is allowed to roam. In one example, the collar system is configured for a dog although the same system may be useful for other animals or pets, e.g., a cat. In some embodiments, the collar system uses sensor fusion to maximize the continual runtime of the collar per individual charge cycle. For instance, the localization function of the collar system utilizes a plurality of communication mechanisms which are activated only under certain conditions to conserve the energy stored in an onboard energy source. A plurality of real-time location sensors/services, e.g., a communication module suitable for radio frequencies of Sub-1 GHz and BLE can be used when low power consumption of the communication module is desired. While disposed in a communication mode utilizing Sub-1 GHz frequencies or BLE, energy consumption is minimized. Communications using Sub 1-GHz become useful when BLE communications can longer be sustained as the range of the communication module disposed on the collar exceeds the limitation of BLE communication. Upon breaching the communication range of the Sub-1 GHz communication mode, other communication modes, e.g., cellular and/or GPS communication can be made active so that the collar can be located using the cellular communication technology and if desired, the GPS technology as well for redundancy. Although the latter two types of communication are the most energy consuming, the availability of at least one of these types of communication allows the collar to be tracked over large areas. In one embodiment, as soon as communication to the present safety collar has been reverted to cellular and/or GPS communication, the caretaker of the animal having the collar is notified, e.g., via the internet, such that a search for the animal can commence immediately. The fusion of these different sensors/communication devices/services allows the system to consume the minimal amount of energy while maintaining the primary objective of accurate real-time detection of uncontrolled departure of the animal safety collar or the animal, as the collar is attached to the collar is attached to the animal.

Based on the real-time relative location of the animal safety collar with respect to the base stations, corrective actions and/or notifications may be deployed to minimize the event of an uncontrolled departure. To mitigate the occurrence of an uncontrolled departure event, the animal safety collar is equipped with multiple corrective and alert mechanisms. The corrective mechanisms include devices and methods deployed to dissuade an animal wearing the safety collar from continuing its current trajectory. Additionally, alert mechanisms are deployed to notify external caretakers 100 that supervision and/or corrective measures may be warranted to prevent an uncontrolled departure event, e.g., by means of the internet 34 (see FIG. 1) and mobile device 82 (see FIG. 1).

Figure 2:
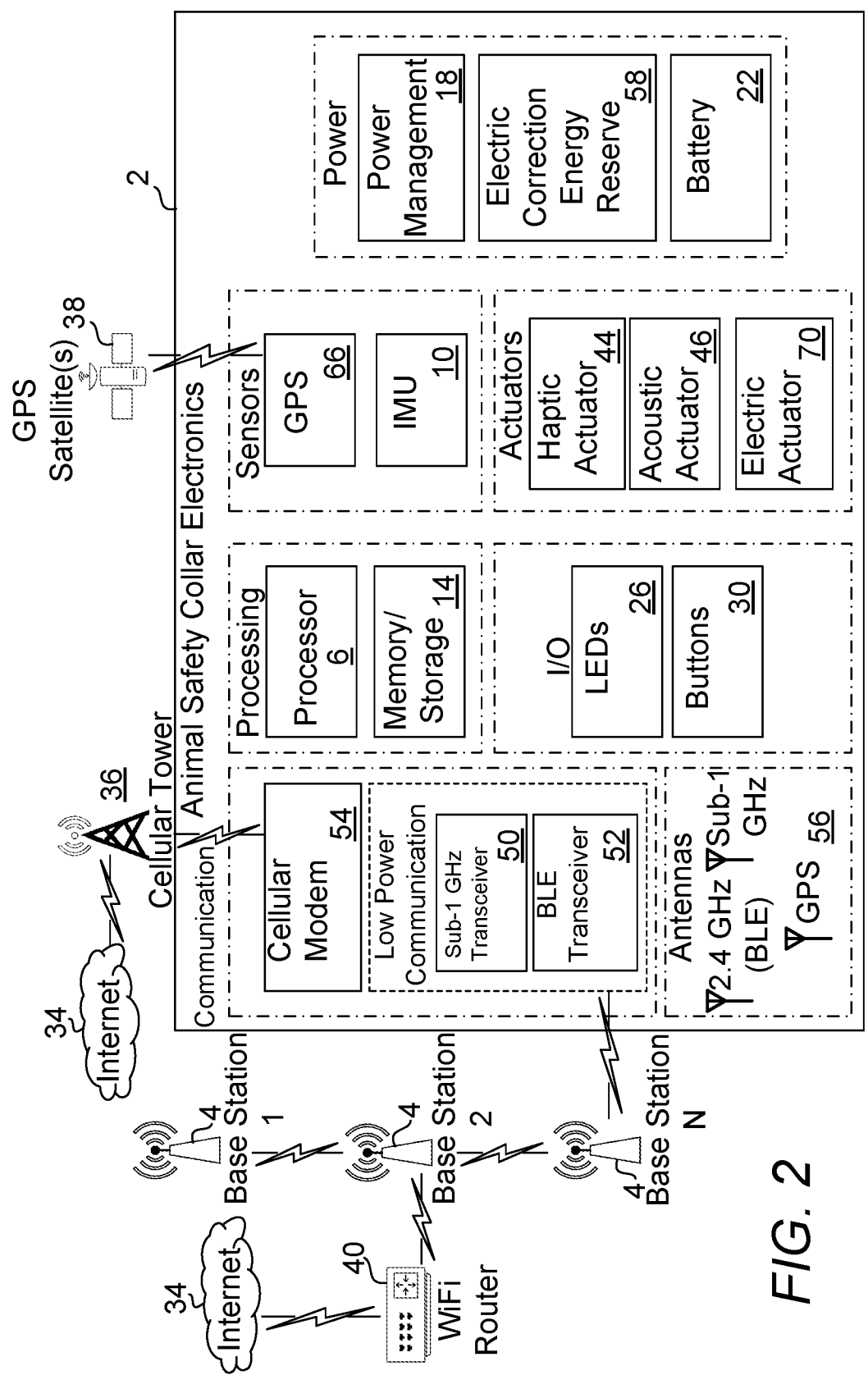
FIG. 2 is a diagram depicting one embodiment according to a collar module of the present animal safety collar system and its communication with base stations and other external devices.
Figure 2A:
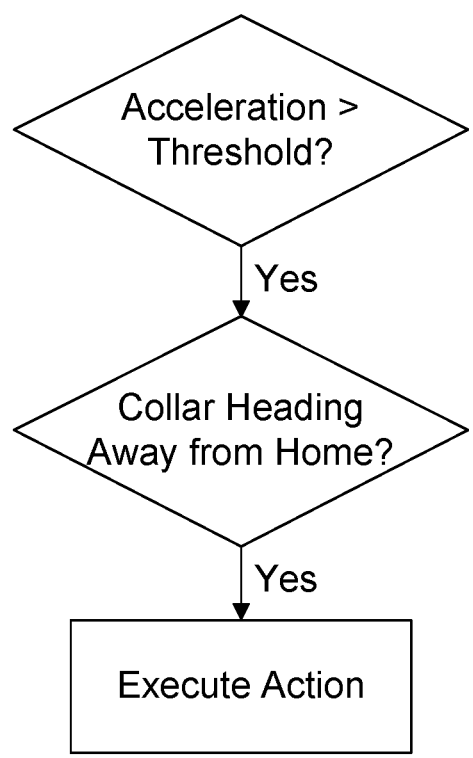
FIG. 2A is a flowchart depicting a combination of data from different sources being used to determine whether an action is necessary in response to a movement of a collar.

FIG. 1 is a diagram depicting one embodiment according to the present animal safety collar module 2. This system diagram outlines the primary use case of animal safety at a residential property. Residential properties are generally constrained to property lines and/or boundaries. Typically, these boundaries are also boundaries that an animal should remain within. Thus, the present animal safety collar system is designed to help prevent an animal from crossing and departing these boundaries. As shown in FIG. 1, these boundaries are identified by a series of connected vertices that form a geo-fence. Inside the geo-fence is a residential building/structure that contains the wireless base stations 4 for the animal safety system. Each deployment of the animal safety system optimally requires a minimum of three base stations 4 but may operate with reduced accuracy with a lower number of base stations 4. FIG. 2 is a diagram depicting one embodiment according to a collar module of the present animal safety collar system and its communication with base stations and other external devices. The animal safety collar primarily uses low-power communication methods with one or many base stations. The collar module 2 includes multiple low-power communication modules or transceivers. These transceivers 50, 52 can send and receive communication via Sub-1 GHz and Bluetooth Low Energy (BLE). The Sub-1 GHz module 50 supports multiple protocols, e.g., IEEE 802.15.4, and may be used with multiple frequency bands based on antenna selection from the plurality of antennas 56. The collar module 2 is also equipped with a cellular communication module 54 configured to communicate by cellular communication via a cellular tower 36. This cellular communication module may be used in the event of an uncontrolled departure and/or when the animal safety collar is outside the range of the base stations. In one embodiment, the uncontrolled departure is characterized by a movement in a direction of from a safe zone to a departure zone at an acceleration, as indicated by the collar module inertial measurement unit (IMU) 10, that exceeds a predetermined acceleration threshold for at least a predetermined period of time. FIG. 2A is a flowchart depicting a combination of data from different sources, a first source providing location data or its time derivatives, e.g., velocity and acceleration and a second source providing a movement detection and/or heading information, used to determine whether an action is necessary in response to a movement of a collar. An IMU is used in the animal safety collar as an input-receiving device to provide an estimate of the collar's current heading and velocity. The heading vector is defined relative to the collar itself. The heading vector quantifies the direction in which the collar is headed and the velocity. The heading vector is primarily derived from the output of one or more IMUs 10 within the collar module. The heading vector is further fused with signal information provided by the base stations. Using the collar's current and previous location and heading vectors, a future location of collar may be estimated. This future estimate can be used to define system behavior. The overall behavior of the system is distilled down to the relative location zone the collar is expected to be. The IMU unit is also used as a mechanism to identify periods of inactivity. During periods of inactivity, the collar electronics are placed in their lowest energy consumption or sleep modes to conserve battery power. In sleep mode, all communications may be turned off to conserve battery power. The animal safety collar includes a plurality of actuators that are useful for deploying corrective actions to dissuade an animal from crossing defined boundaries. In one embodiment, the magnitude of this predetermined value depends on the distance of the collar module to the boundary between the correction zone 92 and the departure zone 94. In one embodiment, the cellular communication module provides communication to internet services that can relay information to the caretaker 100 via a mobile device 82. Either the BLE or the Sub-1 GHz communication can be used to calculate the collar's location relative to the base stations. The received signal strength indicator (RSSI) values from communication packets are used with trilateration techniques to estimate the relative position of the collar. These values are also used, e.g., by control device 6 and/or control device 8 (of the base station) to determine whether a type of communication is nearing its useful range before switching to another type of communication.

The animal safety collar includes a few sensors that are used to aid in determining real-time location information. A Global Positioning System (GPS) is a module 66 used to obtain global coordinates. The GPS is only used when the system determines it is absolutely required. Also, the GPS is only used if there exists an adequate line of sight to multiple GPS satellites 38. The limited usage of the GPS is due to the time required for initial fix with GPS satellites and the overall power consumption. However, during an uncontrolled departure, the GPS usage is maximized in case the collar leaves the range of Sub-1 GHz with the base stations.

A haptic actuator 44 is provided to supply vibrational feedback to indicate to an animal that it is nearing a controlled boundary and to discontinue its current trajectory. An acoustic actuator 46 is used in a similar manner as the haptic actuator but it uses a speaker/buzzer. An electric actuator, e.g., a shock electrode/probe 70 is useful for supplying electric stimulation and it is used as the last effort to encourage a corrective action of the animal.

In order for a caretaker 100 to interact, input/output components, e.g., light emitting diodes (LEDs) 26 and push buttons 30 are functionally connected to the collar module control device 6. One or more of these equipment are used for displaying the collar status and allowing the caretaker 100 to physically interact with the device. In one embodiment, the animal safety collar is a battery-operated device. The power aspects of the collar include the battery 22 and power management circuitry 18 required to deliver power to all of the electrical components of the collar as well as to manage battery charging. The charging of the battery is accomplished using an external connection to a direct current (DC) power source. In the embodiment shown, there is further provided an electric correction energy reserve 58. This energy reserve does not need to be a separate energy storage but rather a level of charge determined to be sufficient to actuate corrective outputs or actuators, e.g., a shock probe 70, a haptic actuator 44 or an acoustic actuator 46. If the level of battery 22 charge drops below a predetermined threshold to be sufficient for at least one of any one of the actuators.

Figure 3:
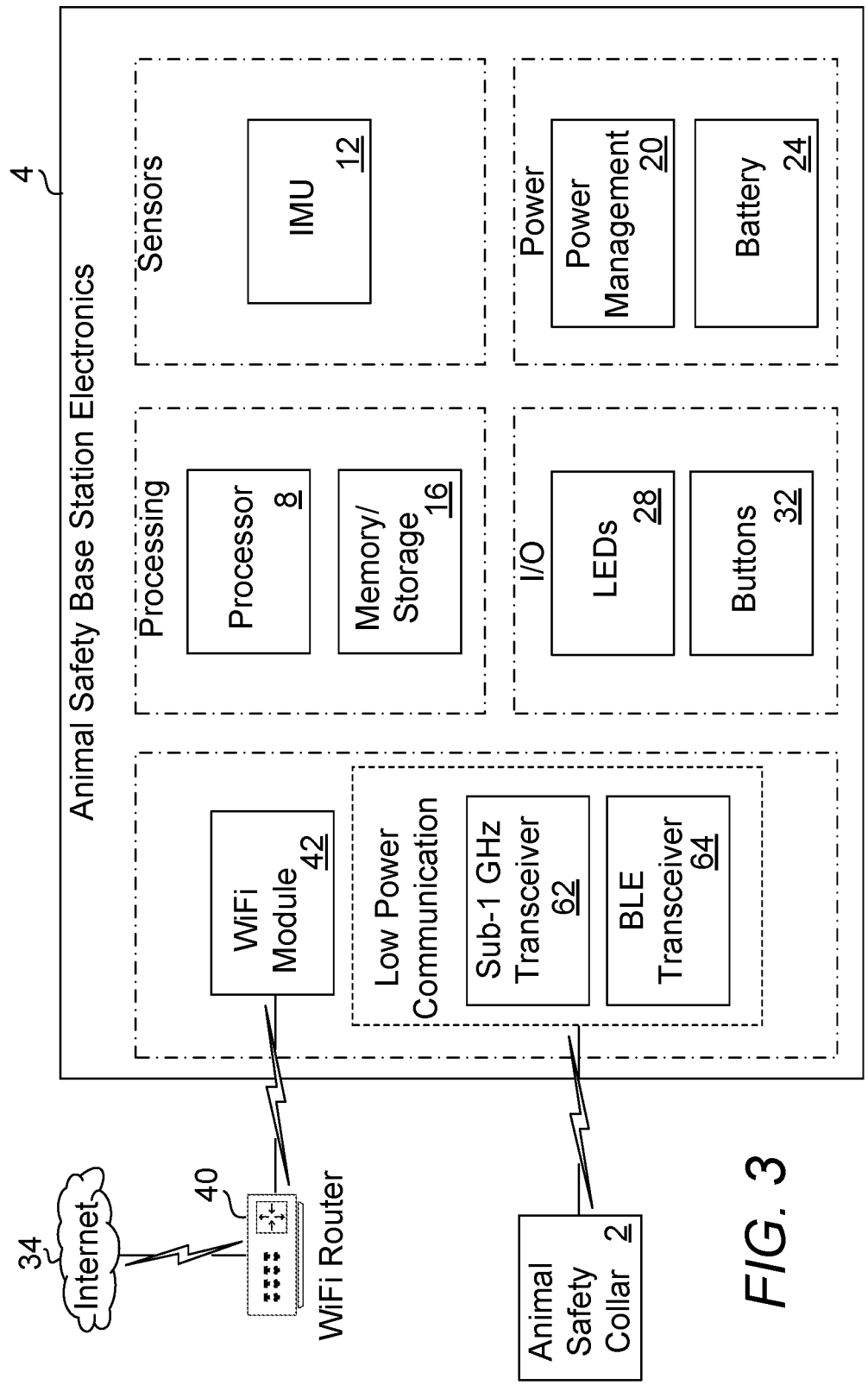
FIG. 3 is a diagram depicting one embodiment according to a base station module of the present animal safety collar system and its communication with a collar module and other external devices.

FIG. 3 is a diagram depicting one embodiment according to a base station module of the present animal safety collar system and its communication with a collar module and other external devices, e.g., a Wireless Fidelity (Wi-Fi) router. In one embodiment, the base stations are equipped with multiple communication modules 62, 64 that enable communication via Sub-1 GHz, BLE and Wi-Fi. The Sub-1 GHz and BLE communication modules 62, 64 are used to communicate to the collar as well as between each other. The BLE communication to the collar is intended for location services within the residential building and for updating the settings or software of the collar. The selective use of a communication module that consumes power at a lower rate contributes to the overall energy conservation of the present collar system, which is especially important for the collar module as it is untethered during use. The Sub-1 GHz communication is used for long-range low power communication to the collar as well as calculating location information. Each base station includes a Wi-Fi module 42 which uses high-power communication methods, e.g., via Wi-Fi protocol of the Wi-Fi router 40, to relay information to external internet 34 services.

A base station's Wi-Fi module is used to relay collar information and notifications to services hosted on the internet by way of a control device 8. These internet services store and relay information to a caretaker via a mobile device. Services suitable to relay information from the internet to a mobile device include, but are not limited to, a phone application, Short Message Service (SMS), push notifications, email and voice calls, etc. The Wi-Fi connection also enables internet services to update settings or actuate various actions on the collar by passthrough communications, e.g., from a base station to a collar.

Each base station includes a minimal number of sensors as it is intended to be mainly as a communication device. Each base station includes an IMU sensor 12 to detect anomalous movement of the base station to alert the collar system that re-calibration may be required. The position of each base station with respect to other base stations is vital to maintaining the accuracy of the system. Therefore, if a base station moves, a re-calibration process is required to maintain the accuracy of the location services. In one embodiment, there are input/output components including LEDs 28 and push buttons 32. These are useful for displaying the status of a base station and they allow a user to physically interact with the base station.

In one embodiment, each base station's primary power source is an external DC power source. The base station's primary application is for residential use and it is expected to be inside a building with electrical sources, e.g., wall power. The base station may also be equipped with a battery 24 in the event the animal safety system is to be used in an "on-the-road" scenario, i.e., a scenario where the base station is inconvenient to receive power via wall power.

While disposed on an animal, the present collar is useful for detecting the movements of an animal. A plurality of types of movements can be inferred from the location information. For instance, an uncontrolled departure of the animal safety collar can be detected via sensor-fused real-time location information provided by one or many communication modules and sensors. The sensor fused real-time location information is periodically updated and aggregated into a location vector and a heading vector 96. Using the collar's current and previous location/heading vectors, the system can predict the collar's future location. This future location is then used to identify the probability (risk) of an uncontrolled departure event. If the probability of a potential near-future uncontrolled departure exceeds a safety margin threshold, then the appropriate actions are triggered to intervene and attempt to prevent the departure. If an uncontrolled departure is detected, then appropriate notifications and actions are immediately engaged. Real-time location information is obtained using multiple positioning techniques including proximity positioning, trilateration and fingerprinting, etc. These techniques are applied to signals obtained from GPS and Received Signal Strength Indicator (RSSI) values from Sub-1 GHz/BLE communication modules. The techniques used and the decision to use a technique are based on the collar's proximity to base stations and/or geo-fence boundaries. Despite the technique used, the resulting information provided to the animal safety system is a set of real time location information. The real-time location information is a set composed of a vector for the collar's current location and a vector representing the collar's current heading.

The location vector is relative to a universal frame (see FIG. 1). This universal frame is defined to be a central coordinate of all the base stations used in the system. This universal frame coordinate is derived via the triangulation of RSSI signals amongst all the base stations. In one embodiment, the RSSI signals used are from one or both the BLE and Sub-1 GHz communication modules. Furthermore, this universal coordinate 84 can be correlated to global coordinates if external GPS coordinates are provided to the system for the base stations. The location vector itself is a result of trilateration of the RSSI values received by the collar from the BLE/Sub-1 GHz base stations. The trilateration coordinates are then transformed to relative coordinate with respect to the universal frame of reference.

Referring back to FIGS. 2 and 3, there is further provided a collar module memory device 14 configured to retain critical settings or records of the collar, e.g., communication settings of the collar with other communication modules or devices, the last known GPS coordinates of the collar with timestamps, any identifying or contact information of the collar and the last known communication device/s the collar is functionally connected with, etc. There is also provided a base station module memory device 16 for at least one of the base stations 4 connected in a network, the memory device 16 is configured to retain data pertaining to the collar/s the base station is functionally connected with, e.g., communication settings of one or more collars, etc.

The present system utilizes a datastore of relative location coordinates that are used to define various boundary lines. These boundary lines are externally defined by a caretaker of the animal safety collar and are representative of a geo-fence. This geo-fence is the area in which the animal safety collar is expected to reside. An uncontrolled departure event is thus defined by an event where the animal safety collar is located outside the user-defined geo-fence area. The future or predicted collar real-time location information is relative to a universal reference that is central to all the system's base stations. When a caretaker 100 provides the geo-fence information, this information is relative to global coordinates. The global coordinates may be obtained via maps with global coordinate information or the user may obtain them from the collar itself. If GPS signals are available, a simple calibration procedure may be performed to correlate the global coordinates to relative coordinates. This procedure involves the user placing the collar in a few known global locations, where GPS signals are available, within range of the base stations. These few coordinate locations are then used to calculate a transformation of the relative coordinates to global. If GPS signals are unavailable, then relative coordinates may be used to define geo-fence boundaries 98. In addition to the user-defined geofenced area, additional pseudo boundaries are generated by the system. These pseudo boundaries are used to quantify the animal safety collar's relative risk that an uncontrolled departure may occur. These pseudo boundaries are aggregated to form zones labeled "Sleep," "Safe," "Monitor," "Watch," "Correction," and "Departure." These zones are described below with respect to departure risk, correction requirement and system notification actions. A safe zone 86 is defined as a zone where there is a lowest risk of departure. No supervision or correction is required and no notifications to the caretaker 100 is required. A monitor zone 88 is defined as a zone where there is a small potential risk of departure. No supervision is recommended, no correction is required and no notifications to the caretaker 100 is required. A watch zone 90 is defined as a zone where there is a potential risk of departure. Supervision is desired, no correction is required. A caretaker 100 may be notified. A correction zone 92 is defined as a zone where there is an imminent risk of departure. Supervision is required and correction is required. A caretaker 100 is notified. A departure zone 94 is defined as a zone where an uncontrolled departure is detected. Supervision is required. A correction attempt is deemed to have been ineffective and an alert system is deployed.

The animal safety system has multiple sensors and communication modules that may be used to derive real-time location information. These sensors and communication modules have varying levels of energy consumption, utilization range and accuracies. The animal safety system fuses the information from these sensors and modules in such a way that it minimizes the energy consumption while still maintaining quality of service. For instance, when GPS, a relatively high power-consuming device is unnecessary, other lower power-consuming communication devices, e.g., those communicating via Sub-1 GHz and BLE frequencies or protocols are used instead.

Based on the location and a movement of the collar with respect to the zones disclosed elsewhere herein, the animal safety collar system dynamically selects a communication method to be used. FIG. 4 is a table showing various communication modes between a collar module and external devices in various geographical zones demonstrating the selective use of various communication strategies for power savings, location accuracies and accuracies of derivatives of locations with respect to time, e.g., velocities and accelerations. Additional power saving is achieved by placing the animal safety collar in sleep modes whenever possible. The IMU units in the collar are used to detect periods of inactivity. If the collar is not actively moving, there is no need for high-resolution location updates, therefore the collar is configured to enter a sleep mode with the communication modules disposed in an inactive state, except when either the cellular or GPS communication is active. The collar is configured to exit the sleep mode whenever it detects a significant motion of the collar.

Figure 5:
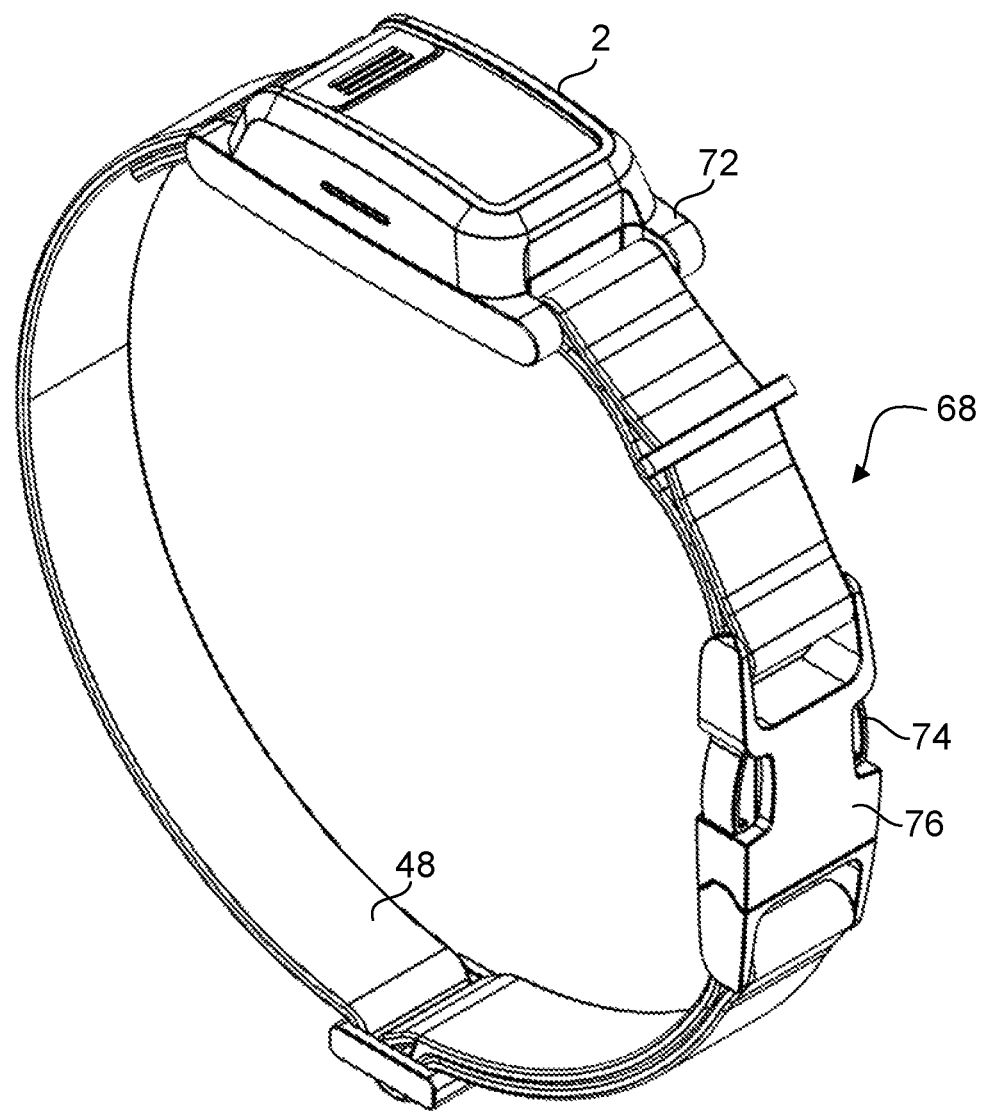
FIG. 5 is a top perspective view of a present collar disposed in a closed configuration.
Figure 6:
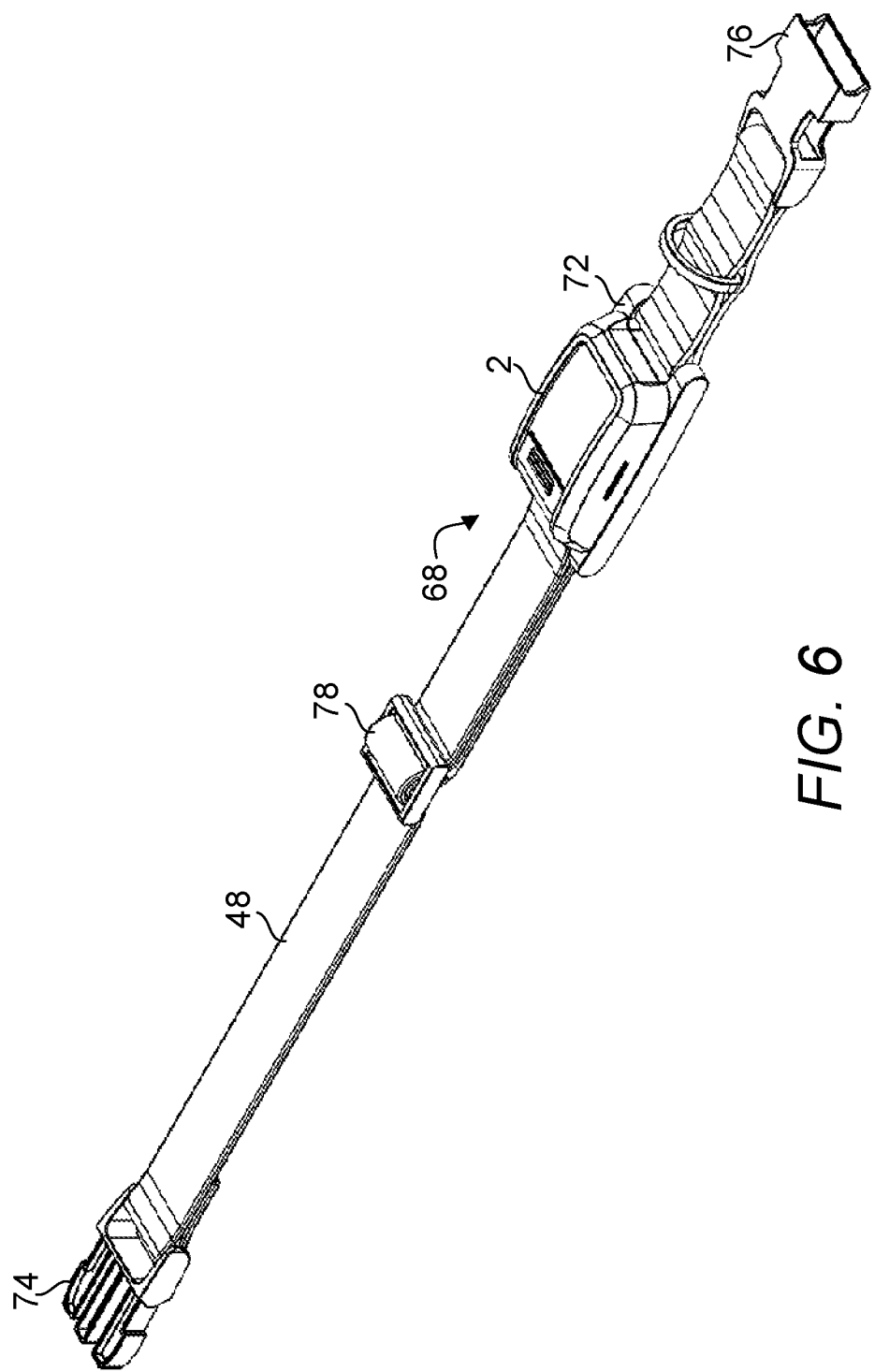
FIG. 6 is a top perspective view of a present collar disposed in an open configuration.
Figure 7:
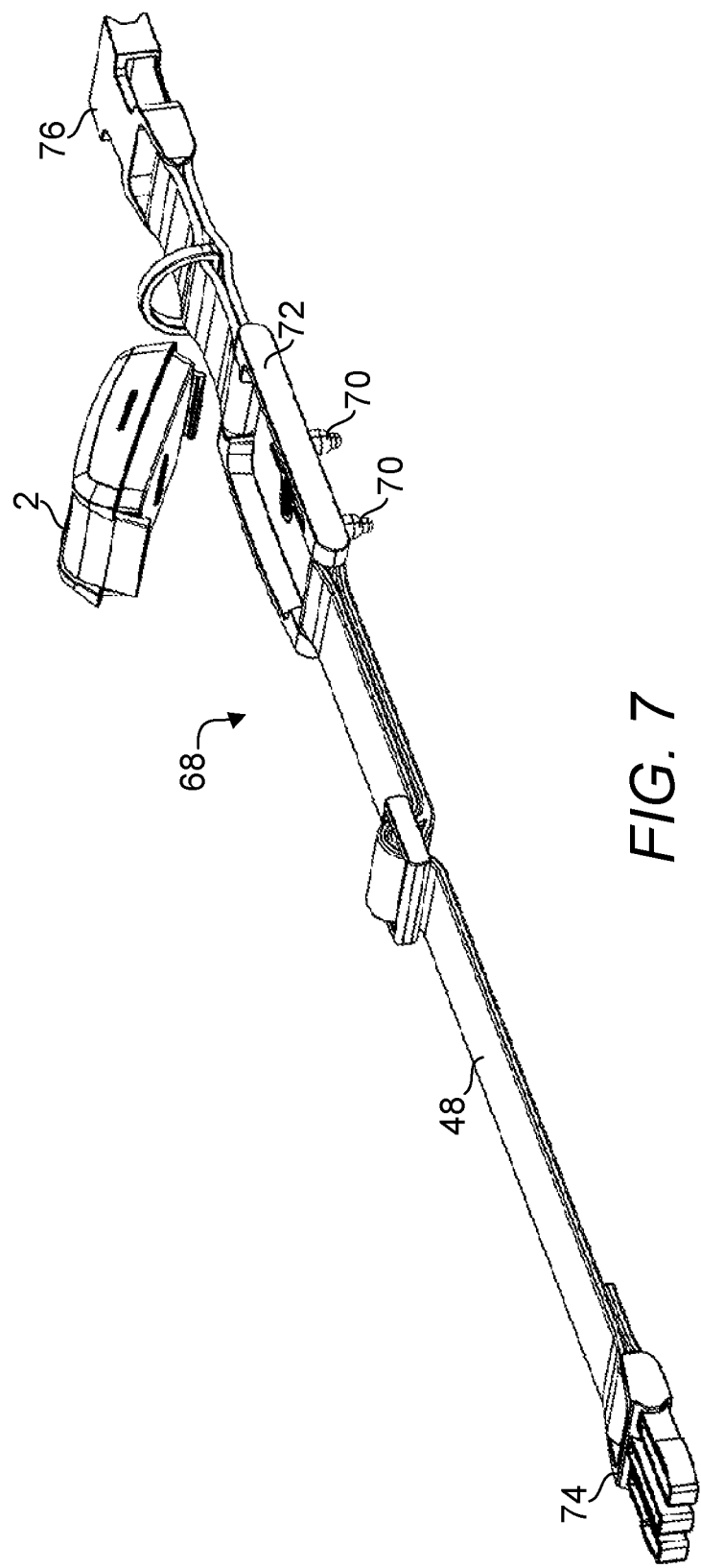
FIG. 7 is a top perspective view of a present collar disposed in an open configuration and the collar module removed from its cradle.
Figure 8:
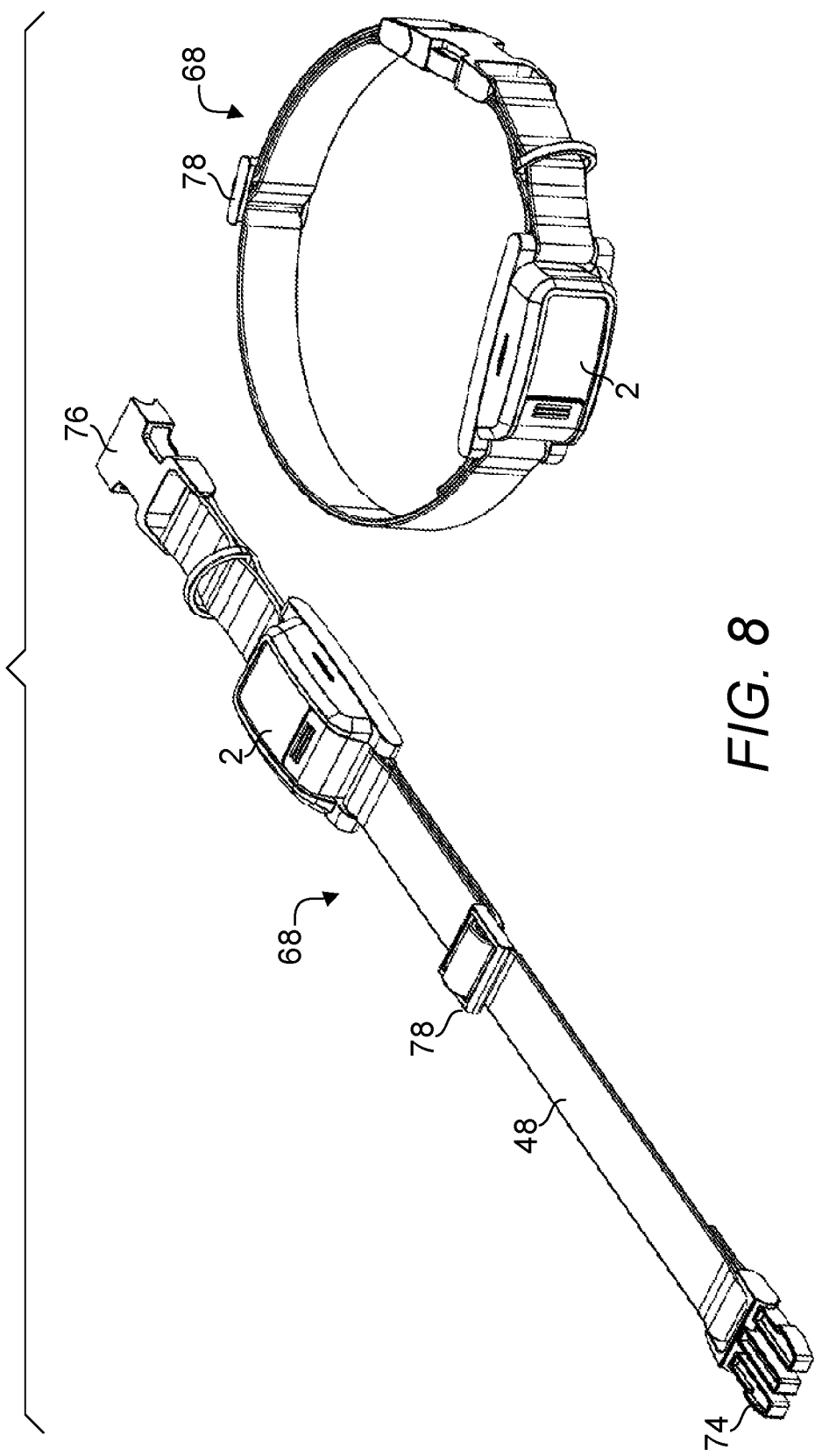
FIG. 8 is a top perspective view of a first collar disposed in an open configuration and the collar module removed from its cradle and a second collar disposed in a closed configuration.
Figure 9:
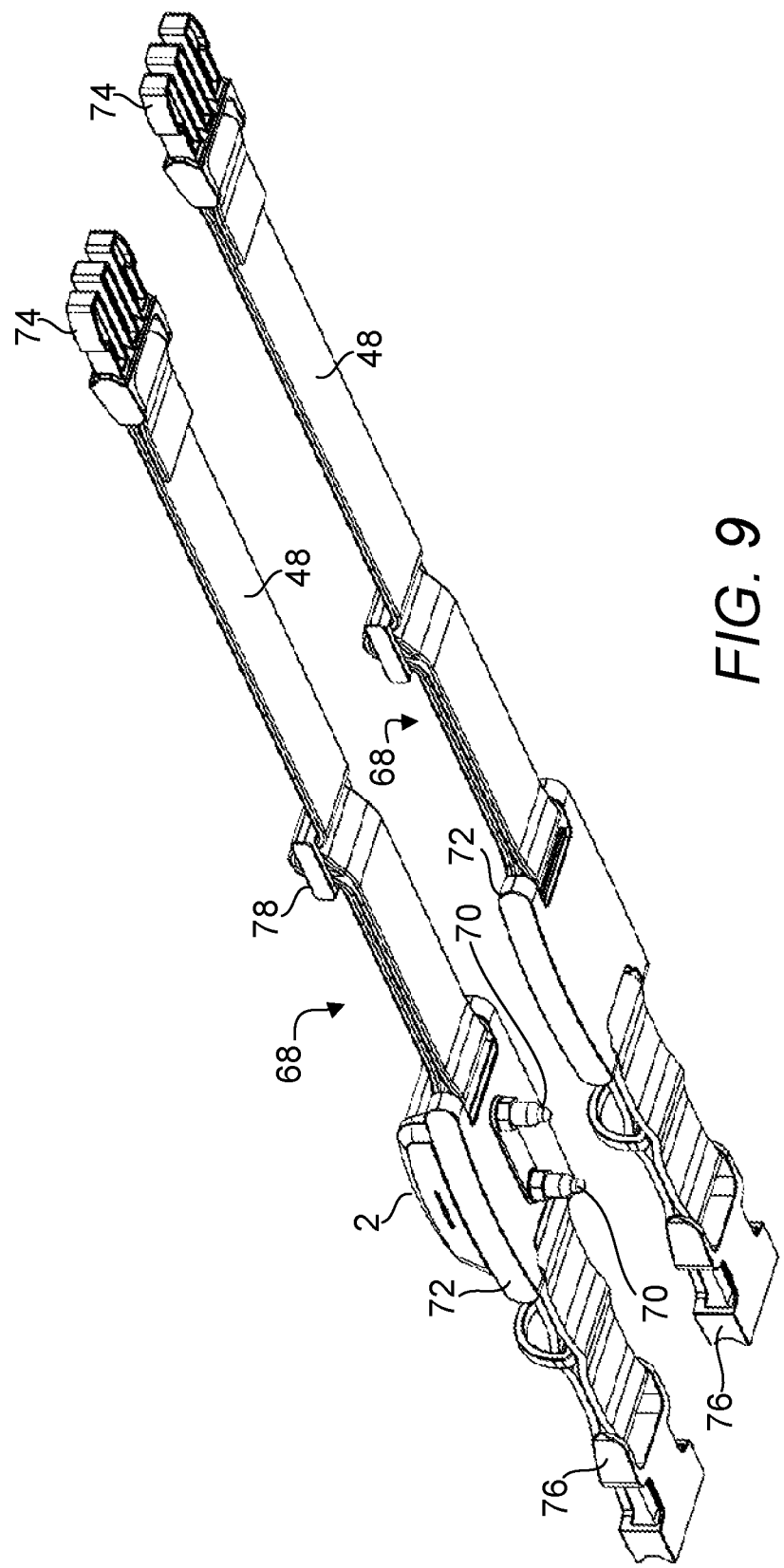
FIG. 9 is a bottom perspective view of a first collar having a shock probe and a second collar without a shock probe.
Figure 10:
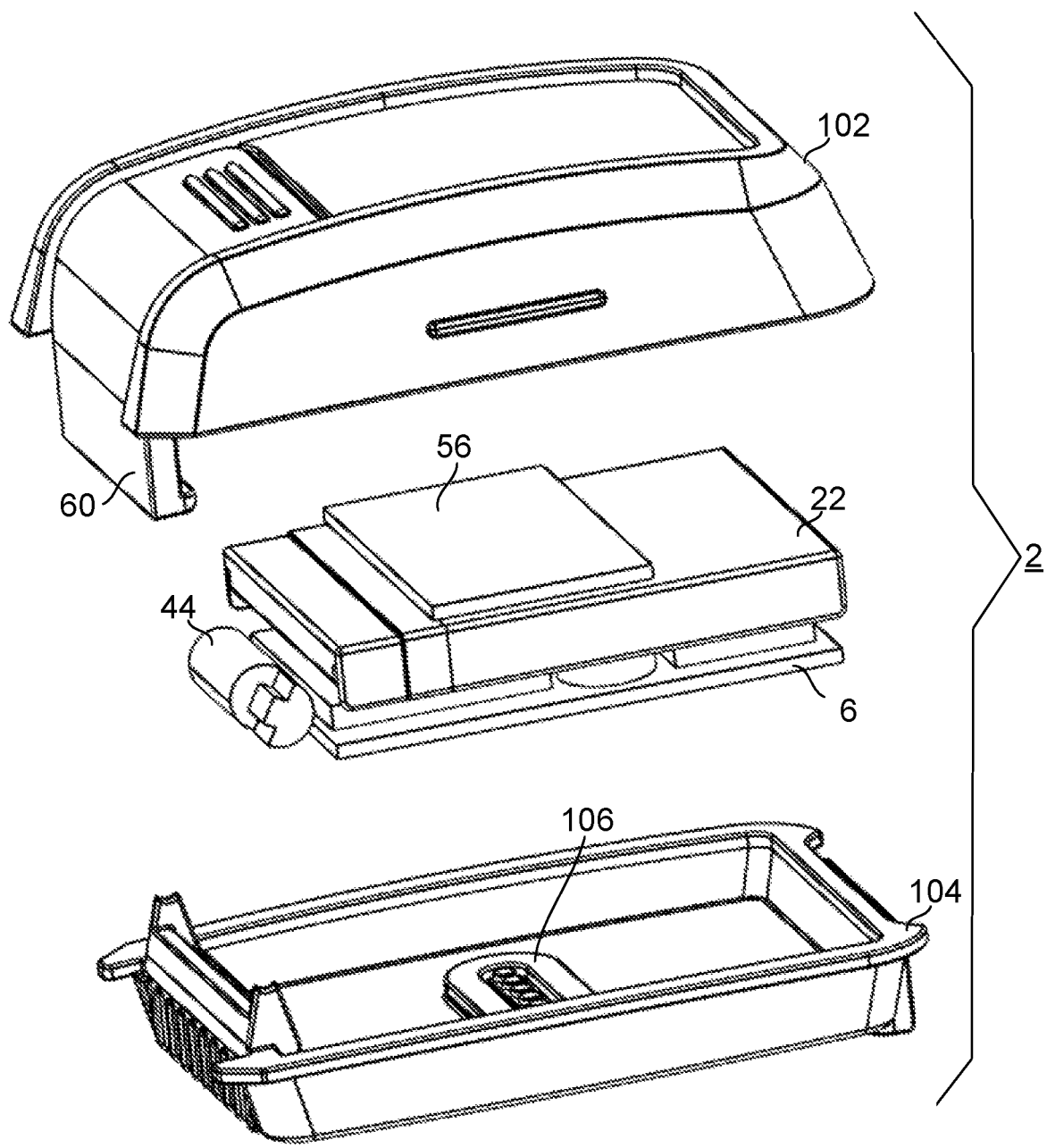
FIG. 10 is an exploded view of a collar module.
Figure 11:
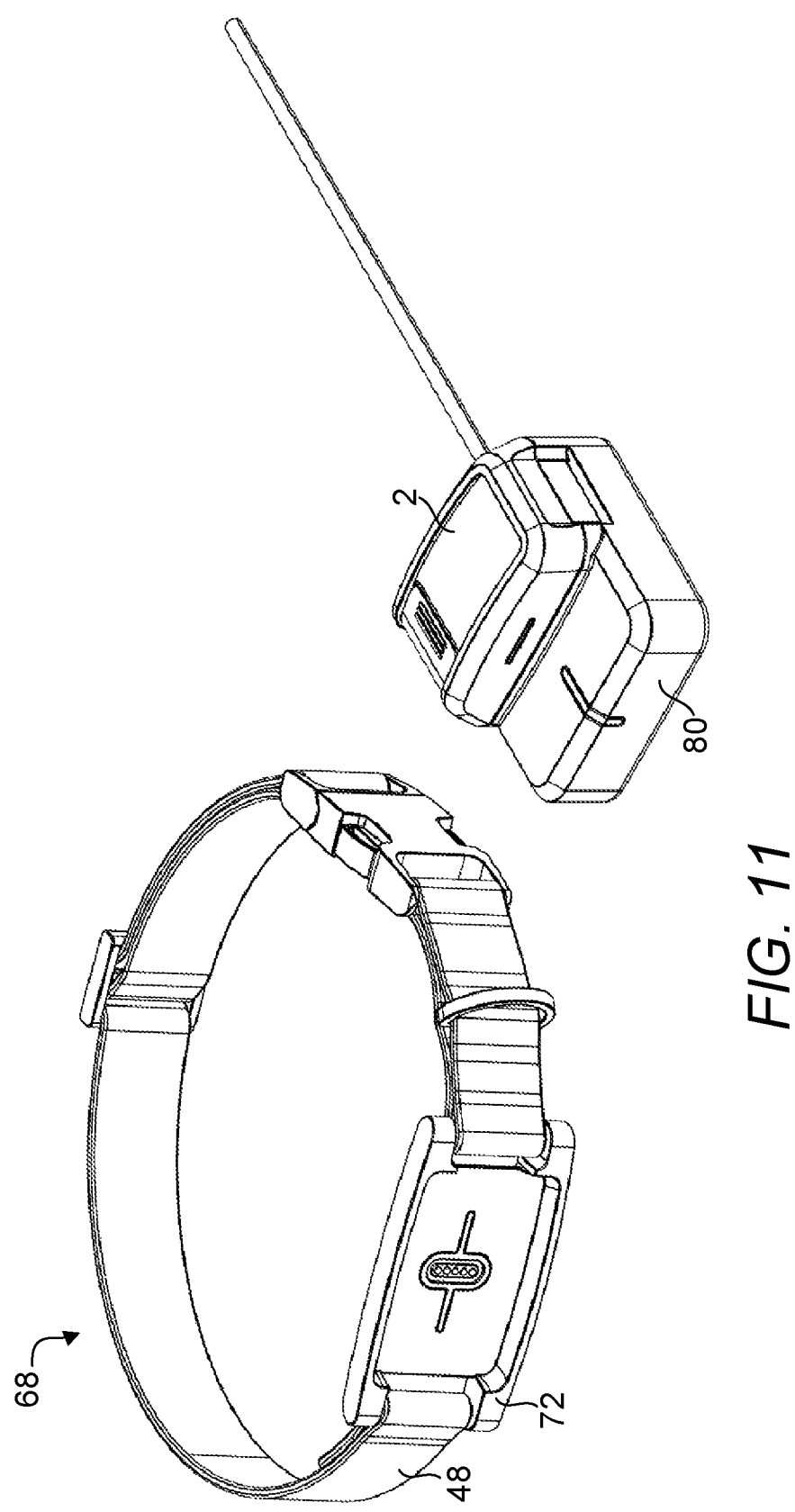
FIG. 11 is a top perspective view of a collar module having been removed from its cradle to be replenished using a charger.

FIG. 5 is a top perspective view of a present collar 68 disposed in a closed configuration. FIG. 6 is a top perspective view of a present collar 68 disposed in an open configuration. FIG. 7 is a top perspective view of a present collar 68 disposed in an open configuration and the collar module 2 removed from its cradle. FIG. 8 is a top perspective view of a first collar disposed in an open configuration and the collar module removed from its cradle and a second collar disposed in a closed configuration. FIG. 9 is a bottom perspective view of a first collar having a shock probe and a second collar without a shock probe. A caretaker may remove collar module 2 from its cradle 72. Therefore, the replenishment of battery 22 does not require removal of the collar from the animal. If more than one collar module 2 is provided, the collar module 2 removed to be charged can be replaced with another module programmed similarly or identically to the former module. In one embodiment, program settings and data collected in one collar module are automatically synchronized via one or more communication means available on the collar modules as disclosed elsewhere herein. FIG. 10 is an exploded view of a collar module 2. The collar module 2 is shown composed of an upper shell 102, a lower shell 104, a charging connection 106 disposed on the lower shell 104, a control device 6, an antenna 56 and a latch 60 configured to be coupled with a tab disposed on the lower shell 104 for removably securing the two shells 102, 104 together among other components disposed within the shells 102, 104. FIG. 11 is a top perspective view of a collar module 2 having been removed from its cradle 70 to be replenished using a charging station 80. At least one strap 48 is used for forming a collar around an animal's neck. As shown herein, two straps 48 are provided, one of which is made be adjustable in its length by means of an adjustment clasp 78. One end of a strap 48 is connected to a buckle 74, 76 to facilitate the use and removal of the collar. An interchangeable collar module 2 enables a non-disruptive charging of the collar module, along with customization options for such things as strap size, color and material and the option to switch between shock probe-equipped configuration and one without a shock probe.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An animal safety collar system adapted to safeguard an animal, said system comprising:
   (a) a collar configured to be attached to the animal;
   (b) a first communication module coupled to said collar and a first control device configured to control said first communication module; and
   (c) at least one second communication module and a second control device configured to control said at least one second communication module, said at least one second communication module is configured to be functionally connected via a first communication to said first communication module; and (d) a cellular communication module configured to be disposable in one of an on state and an off state, said cellular communication module functionally connected to said first control device, wherein said first communication module is configured to cooperate with said at least one second communication module to identify a location of the animal and said first communication is disposed at Sub-1 Gigahertz frequency in order to conserve an energy source drawn to support said first communication and said cellular communication module is only disposed in an on state when said location indicates a tendency for an uncontrolled departure of said collar from said at least one second communication module and an action is taken to reduce said tendency.

2. The animal safety collar system of claim 1, further comprising a third communication module and at least one fourth communication module, said third communication module is coupled to said collar and said first control device is further configured to control said third communication module, said second control device is further configured to control said at least one fourth communication module, said at least one fourth communication module is configured to be functionally connected via a second communication to said third communication module, wherein said third communication module is configured to cooperate with said at least one fourth communication module to identify a location of the animal and said second communication is disposed at Bluetooth Low Energy (BLE) in order to conserve the energy source drawn to support said second communication.

3. The animal safety collar system of claim 1, wherein said action comprises notifying a caretaker of the animal.

4. The animal safety collar system of claim 1, further comprising a global positioning system (GPS) configured to be disposable in one of an on state and an off state, said GPS functionally connected to said first control device, wherein said GPS is only disposed in an on state when said location indicates a tendency for an uncontrolled departure of said collar from said at least one second communication module and an action is taken to reduce said tendency.

5. The animal safety collar system of claim 4, said action comprises notifying a caretaker of the animal.

6. The animal safety collar system of claim 1, further comprising a shock probe configured for supplying electrical feedback to the animal, said shock probe functionally connected to said first control device and configured to be disposed in contacting engagement with the animal to supply feedback to indicate to the animal that it is nearing a controlled boundary and to discontinue its current trajectory.

7. The animal safety collar system of claim 1, further comprising a haptic actuator functionally connected to said first control device and configured for supplying vibrational feedback to indicate to the animal that it is nearing a controlled boundary and to discontinue its current trajectory.

8. The animal safety collar system of claim 1, further comprising an acoustic device functionally connected to said first control device and configured for supplying auditory feedback to indicate to the animal that it is nearing a controlled boundary and to discontinue its current trajectory.

9. The animal safety collar system of claim 1, further comprising a closeable strap, a cradle and a modular housing, wherein said closeable strap is configured to be worn around a neck of the animal, said cradle disposed on said closeable strap, said modular housing is configured to be securable in and removable from said cradle and said modular housing is configured to contain the energy source.

10. The animal safety collar system of claim 1, further comprising an inertial measurement unit configured for providing an acceleration and a heading of the animal, wherein if the location is determined to be disposed in a zone with a potential risk of departure, said acceleration exceeds a predetermined acceleration threshold and said heading indicates a heading away from a safe zone while in the zone with a potential risk of departure, an action is taken to reduce the tendency of the animal to continue to depart farther away from the safe zone.

11. The animal safety collar system of claim 1, wherein said collar is a dog collar.

12. An animal safety collar system adapted to safeguard an animal, said system comprising:
(a) a collar configured to be attached to the animal, said collar comprises a closeable strap and a cradle disposed on said closeable strap;
(b) a first communication module functionally connected to a second communication module according to a communication and a first control device configured to control said first communication module;
(c) a modular housing, wherein said closeable strap is configured to be attached to a portion of the animal, said modular housing is configured to be securable in and removable from said cradle and said modular housing is configured to contain an energy source to power said first communication module; and
(d) a cellular communication module configured to be disposable in one of an on state and an off state, said cellular communication module functionally connected to said first control device, wherein said cellular communication module is only disposed in an on state when said location indicates a tendency for an uncontrolled departure of said collar from said at least one second communication module and an action is taken to reduce said tendency.

13. The animal safety collar system of claim 12, wherein said communication is disposed at Sub-1 Gigahertz frequency in order to conserve the energy source drawn to support said communication.

14. The animal safety collar system of claim 12, wherein said communication is instead disposed at Bluetooth Low Energy (BLE) in order to conserve the energy source drawn to support said communication.

15. The animal safety collar system of claim 12, further comprising a global positioning system (GPS) configured to be disposable in one of an on state and an off state, said GPS functionally connected to said first control device, wherein said GPS is only disposed in an on state when said location indicates a tendency for an uncontrolled departure of said collar from said at least one second communication module and an action is taken to reduce said tendency.

16. The animal safety collar system of claim 12, further comprising a shock probe configured for supplying electrical feedback to the animal, said shock probe functionally connected to said first control device and configured to be disposed in contacting engagement with the animal to supply feedback to indicate to the animal that it is nearing a controlled boundary and to discontinue its current trajectory.

17. The animal safety collar system of claim 12, further comprising a haptic actuator functionally connected to said first control device and configured for supplying vibrational feedback to indicate to the animal that it is nearing a controlled boundary and to discontinue its current trajectory.

18. The animal safety collar system of claim 12, further comprising an inertial measurement unit configured for providing an acceleration and a heading of the animal, wherein if the location is determined to be disposed in a zone with a potential risk of departure, said acceleration exceeds a predetermined acceleration threshold and said heading indicates a heading away from a safe zone while in the zone with a potential risk of departure, an action is taken to reduce the tendency of the animal to continue to depart farther away from the safe zone.

19. An animal safety collar system adapted to safeguard an animal, said system comprising:
(a) a collar configured to be attached to the animal;
(b) a first communication module coupled to said collar and a first control device configured to control said first communication module;
(c) at least one second communication module and a second control device configured to control said at least one second communication module, said at least one second communication module is configured to be functionally connected via a first communication to said first communication module; and
(d) a third communication module and at least one fourth communication module, said third communication module is coupled to said collar and said first control device is further configured to control said third communication module, said second control device is further configured to control said at least one fourth communication module, said at least one fourth communication module is configured to be functionally connected via a second communication to said third communication module,
wherein said first communication module is configured to cooperate with said at least one second communication module to identify a location of the animal and said first communication is disposed at Sub-1 Gigahertz frequency in order to conserve an energy source drawn to support said first communication and said third communication module is configured to cooperate with said at least one fourth communication module to identify a location of the animal and said second communication is disposed at Bluetooth Low Energy (BLE) in order to conserve the energy source drawn to support said second communication.

20. An animal safety collar system adapted to safeguard an animal, said system comprising:
(a) a collar configured to be attached to the animal;
(b) a first communication module coupled to said collar and a first control device configured to control said first communication module;
(c) at least one second communication module and a second control device configured to control said at least one second communication module, said at least one second communication module is configured to be functionally connected via a first communication to said first communication module; and
(d) a global positioning system (GPS) configured to be disposable in one of an on state and an off state, said GPS functionally connected to said first control device,
wherein said first communication module is configured to cooperate with said at least one second communication module to identify a location of the animal and said first communication is disposed at Sub-1 Gigahertz frequency in order to conserve an energy source drawn to support said first communication and said GPS is only disposed in an on state when said location indicates a tendency for an uncontrolled departure of said collar from said at least one second communication module and an action is taken to reduce said tendency.

21. An animal safety collar system adapted to safeguard an animal, said system comprising:
(a) a collar configured to be attached to the animal;
(b) a first communication module coupled to said collar and a first control device configured to control said first communication module;
(c) at least one second communication module and a second control device configured to control said at least one second communication module, said at least one second communication module is configured to be functionally connected via a first communication to said first communication module; and
(d) an inertial measurement unit configured for providing an acceleration and a heading of the animal,
wherein said first communication module is configured to cooperate with said at least one second communication module to identify a location of the animal and said first communication is disposed at Sub-1 Gigahertz frequency in order to conserve an energy source drawn to support said first communication and if the location is determined to be disposed in a zone with a potential risk of departure, said acceleration exceeds a predetermined acceleration threshold and said heading indicates a heading away from a safe zone while in the zone with a potential risk of departure, an action is taken to reduce the tendency of the animal to continue to depart farther away from the safe zone.

22. An animal safety collar system adapted to safeguard an animal, said system comprising:
(a) a collar configured to be attached to the animal, said collar comprises a closeable strap and a cradle disposed on said closeable strap;
(b) a first communication module functionally connected to a second communication module according to a communication and a first control device configured to control said first communication module;
(c) a modular housing, wherein said closeable strap is configured to be attached to a portion of the animal, said modular housing is configured to be securable in and removable from said cradle and said modular housing is configured to contain an energy source to power said first communication module; and
(d) an inertial measurement unit configured for providing an acceleration and a heading of the animal, wherein if the location is determined to be disposed in a zone with a potential risk of departure, said acceleration exceeds a predetermined acceleration threshold and said heading indicates a heading away from a safe zone while in the zone with a potential risk of departure, an action is taken to reduce the tendency of the animal to continue to depart farther away from the safe zone.

* * * * *